United States Patent
Wintermann et al.

(10) Patent No.: US 6,178,219 B1
(45) Date of Patent: Jan. 23, 2001

(54) HOLDER FOR FUEL ELEMENTS AND METHOD FOR REPAIRING SUCH A HOLDER

(75) Inventors: Benedikt Wintermann, Buckenhof; Friedrich Leibold, Happurg, both of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/363,262

(22) Filed: Jul. 29, 1999

Related U.S. Application Data

(63) Continuation of application No. PCT/EP98/00226, filed on Jan. 16, 1998.

(30) Foreign Application Priority Data

Jan. 29, 1997 (DE) .............................................. 197 03 226

(51) Int. Cl.[7] .............................. G21C 3/33; G21C 19/06
(52) U.S. Cl. .......................... 376/261; 376/303; 376/364; 376/453

(58) Field of Search .................................... 376/260, 261, 376/264, 287, 302, 303, 364, 262, 453

(56) References Cited

U.S. PATENT DOCUMENTS

| 5,430,779 | * | 7/1995 | Baversten et al. | 376/287 |
| 5,502,754 | * | 3/1996 | Erbes | 376/302 |
| 5,600,690 | * | 2/1997 | Weems et al. | 376/302 |

* cited by examiner

*Primary Examiner*—Charles T. Jordan
*Assistant Examiner*—Kyonytack K. Mun
(74) *Attorney, Agent, or Firm*—Herbert L. Lerner; Laurence A. Greenberg; Werner H. Stemer

(57) ABSTRACT

A holder for fuel elements in a reactor, in particular in a boiling water reactor, is provided, as well as a method for repairing such a holder. A core grid is demounted from a core shroud and replaced by a new forged core grid for the purpose of repairing the holder. An adapter ring is to be inserted between the new core grid and the core shroud. There is provision for connecting the adapter ring to the core grid without a welding operation, for example by shrink fitting.

5 Claims, 2 Drawing Sheets

HOLDER FOR FUEL ELEMENTS AND METHOD FOR REPAIRING SUCH A HOLDER

CROSS-REFERENCE TO RELATED APPLICATION

This application is a continuation of copending International Application PCT/EP98/00226, filed Jan. 16, 1998, which designated the United States.

BACKGROUND OF THE INVENTION

1. Field of the Invention

The invention relates to a holder for fuel elements in a nuclear reactor, in particular in a boiling water reactor, with a core shroud and with a forged core grid positioned above the core shroud, in which the core shroud and core grid are connected to one another through the use of an adapter ring. The invention also relates to a method for repairing a holder for fuel elements, in particular in a boiling water reactor, in which a core grid is removed from the upper end of a core shroud and a new forged core grid is connected to the core shroud via an adapter ring.

The internal fittings of a reactor, in particular of a boiling water reactor, include a holder for fuel elements. An integral part of this holder is a core grid, through the orifices of which the fuel elements run. This ensures that the fuel elements can be positioned in a desired way. Another part of the holder is the core shroud which laterally surrounds the reactor core formed from the fuel elements.

When such a holder is being repaired, it may be necessary to exchange the core grid. For this purpose, the latter is separated from the upper end of the core shroud and replaced by a new core grid. This new core grid may be a forged core grid which is more stable than a core grid assembled from metal sheets. The height of such a forged core grid is less than the height of other core grids. It is therefore necessary to connect the new forged core grid to the core shroud via an adapter ring, so that the holder has the same height as heretofore.

It has heretofore been customary to weld the adapter ring to the new core grid. Large-volume weld seams were necessary for this purpose, although these are susceptible to damage. Furthermore, due to the welding operation, heat is transferred into the material of the core grid and of the adapter ring, but the effect of such heat is to increase the susceptibility of the material to corrosion, in particular to stress cracking corrosion. Moreover, the core grid and core shroud are particularly at risk in the region of the weld seams, since radioactive radiation is additionally conducive to corrosion.

SUMMARY OF THE INVENTION.

It is therefore an object of the invention to provide a holder for fuel elements and also a method for repairing such a holder overcoming the above-mentioned disadvantages of the prior art devices and methods of this general type, in which there can be no increased likelihood of corrosion, while the core grid and core shroud are reliably connected or capable of being reliably connected.

With the foregoing and other objects in view, there is provided, in accordance with the invention, a holder for fuel elements in a reactor, in particular in a boiling water reactor, with a core shroud and with a forged core grid positioned above the core shroud, in which the core shroud and the forged core grid are connected to one another through the use of an adapter ring connected to the core grid without a welded joint.

This affords the advantage that there can be no undesirable introduction of heat. Consequently, the risk of corrosion of the core grid and/or core shroud is kept low, even with the radioactive irradiation of the holder which usually occurs in a boiling water reactor.

In accordance with a particular feature of the invention, the adapter ring is inserted loosely between the core grid and the core shroud. Since the core shroud is fastened at its end located opposite the core grid, the adapter ring is thus held clamped between the core grid and the core shroud.

In accordance with a further feature of the invention, the adapter ring can be held to the core grid with a sliding or snug fit. This ensures greater stability.

In accordance with a further particular feature of the invention, the adapter ring can be shrink-fitted on the core grid. Shrink fitting of one component onto another component is known by the keyword "transverse press fit" in "Hütte, des Ingenieurs Taschenbuch, Maschinenbau Teil A" [The Engineer's Manual, Mechanical Engineering Part A], Verlag von Wilhelm Ernst & Sohn, Berlin 1954, pages 105 and 106.

The use of such a shrink-fit connection between the core shroud and the core grid ensures a particularly firm connection which dispenses with a welded joint. The adapter ring can encompass the core grid from outside. For this purpose, the adapter ring is heated until its inside diameter is greater than the outside diameter of the core grid. It is then placed onto the core grid and shrink-fitted as it cools.

In yet another feature according to the invention, the connection of the core grid and adapter ring can additionally be secured, for example, through the use of connecting elements. These connecting elements can be bolts disposed in bores which run from the adapter ring into the core grid. These connecting elements are particularly effective in preventing the two components from moving relative to each other.

With the foregoing and other objects in view, there is also provided, in accordance with the invention, a method for repairing a holder for fuel elements in a reactor, in particular in a boiling water reactor, in which a core grid is removed from the upper end of a core shroud and is replaced by a forged core grid being connected to the core shroud via an adapter ring without a welding operation.

This, too, affords the advantage that a large amount of heat is not introduced into the material of the core grid and adapter ring, and therefore the material, even when it is radioactively irradiated, is scarcely susceptible to corrosion, such as stress cracking corrosion. A stable connection of the core grid and core shroud is nevertheless achieved. The repair can consequently be carried out in a simple way with a reliable result.

The adapter ring is, for example, inserted loosely between the core grid and core shroud. It is then clamped between the two components. For example, the adapter ring is held on the core grid with a sliding or snug fit. The latter can be formed by a recess for the adapter ring in the core grid.

According to a particularly advantageous feature of the invention, the adapter ring can be shrink-fitted on the core grid. The shrink-fitting technique achieves a particularly stable connection without a welding operation.

Moreover, the connection of the adapter ring to the core grid can be secured by means of connecting elements, for example by bolts. The connecting elements, which extend from the adapter ring into the core grid, can stabilize the connection particularly effectively.

Thus the holder and the method for repairing such a holder according to the invention afford, in particular, the advantage that corrosion, in particular stress cracking corrosion, is largely avoided.

Other features which are considered as characteristic for the invention are set forth in the appended claims.

Although the invention is illustrated and described herein as embodied in a holder for fuel elements and a method for repairing such a holder, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DESCRIPTION OF THE PREFERRED EMBODIMENTS

Figure 1:
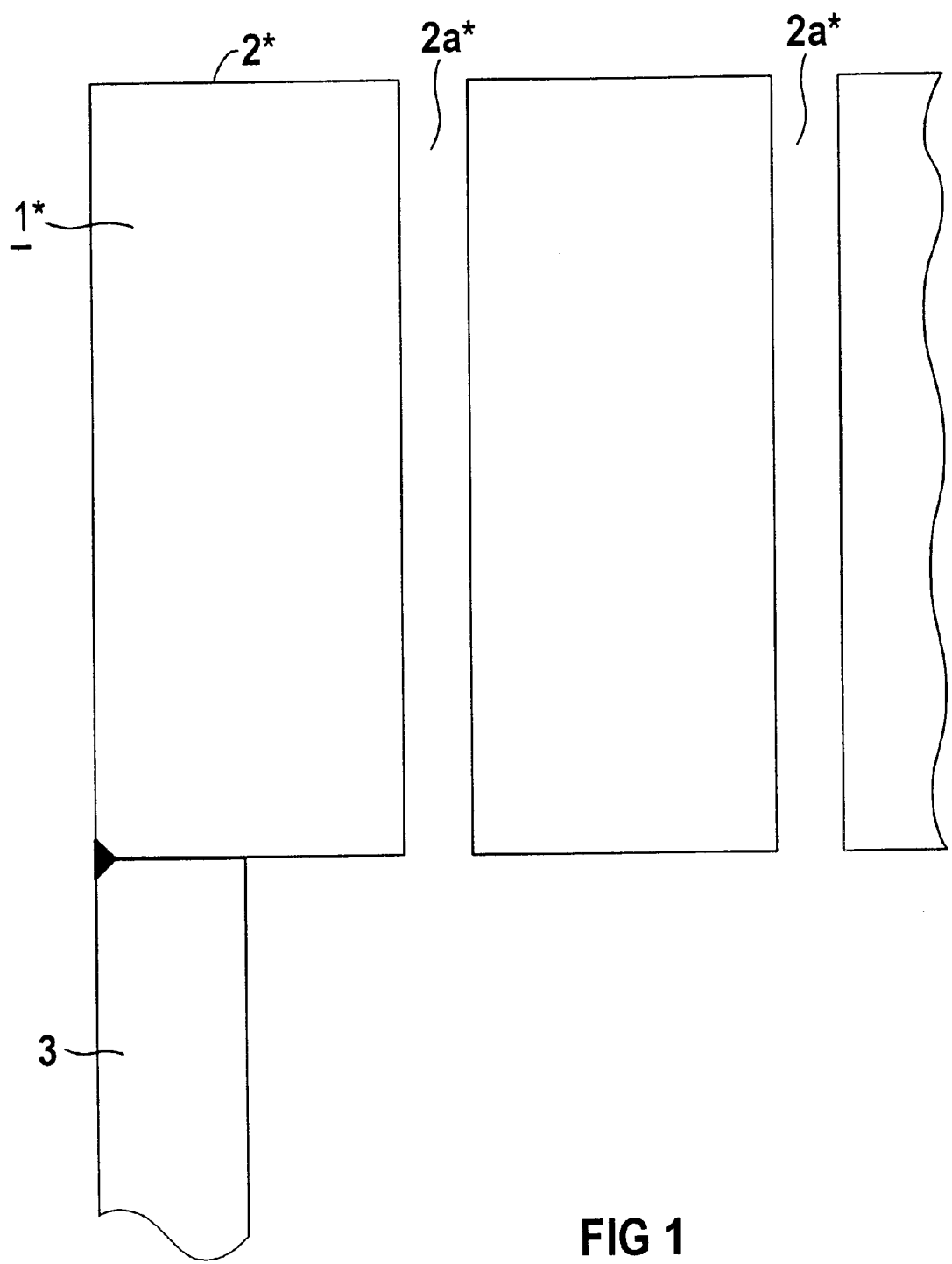
FIG. 1 is a fragmentary diagrammatic, elevational view representation of a holder for fuel elements before being repaired by the method of the invention.
Figure 2:
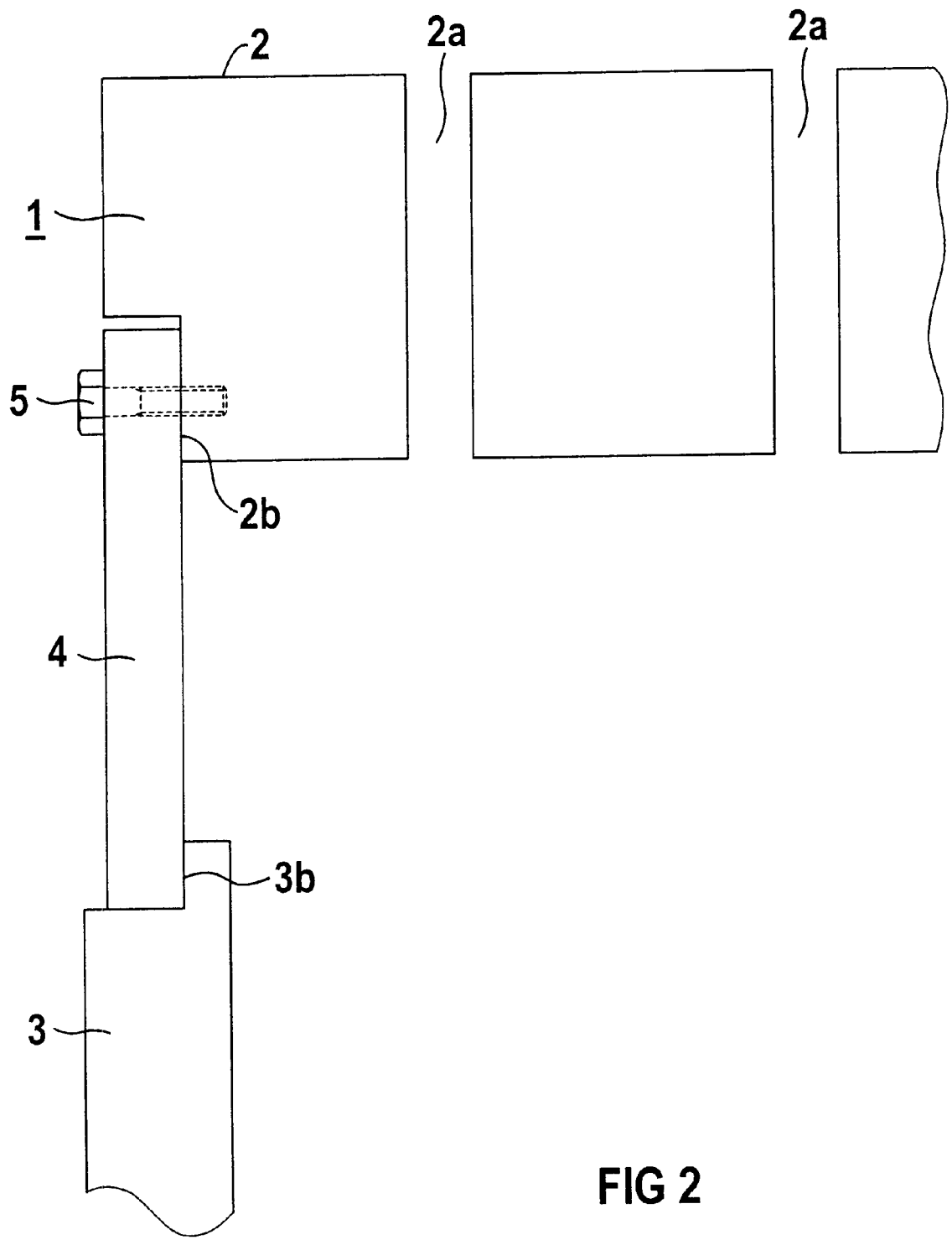
FIG. 2 is a fragmentary diagrammatic, elevational view representation of a holder for fuel elements according to the invention, which can be repaired by the method of the invention.

Referring now to the figures of the drawing as a whole, there is seen a holder 1 disposed in a boiling water reactor, through the use of which fuel rods, but also other components, for example sensor lances, can be held. The upper termination of the holder 1 is formed by a core grid 2 which has a plurality of orifices 2a. Fuel elements or other components are positioned in these orifices 2a. The core grid 2 may be constructed from metal sheets. More preferably, however, it is forged, thus ensuring a high degree of stability. Fuel elements can be pushed into the orifices 2a in the core grid 2. All the fuel elements forming the so-called reactor core are surrounded laterally by a core shroud 3 in the boiling water reactor.

In the event of an exchange of the core grid 2, a core grid 2 formed of of metal sheets is often replaced by a forged core grid 2 which is more stable. This new core grid 2 then has a lower height than the old core grid 2. An adapter ring 4 consequently has to be disposed between the core shroud 3 and core grid 2, so that the fuel elements remain completely surrounded.

The adapter ring 4 is connected to the forged core grid 2 without a welded joint. A welded joint would introduce a large amount of heat into the material of the core grid 2, but also into that of the adapter ring 4 making it particularly susceptible to corrosion, in particular to stress cracking corrosion. This susceptibility would be further reinforced by radiation in a boiling water reactor. The avoidance of a welded joint makes a high corrosion rate impossible.

The adapter ring 4 can be held in recesses 2b, 3b in the core grid 2 and in the core shroud 3. The adapter ring can be inserted loosely, or be held with a sliding or snug fit. In a particularly advantageous embodiment, the adapter ring 4 is shrink-fitted on the core grid 2. In addition, the adapter ring 4 can be secured in position through the use of connecting elements 5 which pass through it and engage into the core grid 2. The connecting elements 5 can be bolts.

We claim:

1. A method for repairing a holder for fuel elements in a reactor, which comprises removing a core grid from an upper end of a core shroud and replacing the core grid with a forged core grid connected to the core shroud via an adapter ring without a welding operation.

2. The method as claimed in claim 1, wherein the reactor is a boiling water reactor.

3. The method as claimed in claim 1, which comprises loosely inserting the adapter ring between the core grid and the core shroud.

4. The method as claimed in claim 1, which comprises shrink-fitting the adapter ring onto the core grid.

5. The method as claimed in claim 1, which comprises securing the connection of the adapter ring to the core grid by connecting elements.

\* \* \* \* \*